United States Patent
Everett et al.

(10) Patent No.: US 12,473,956 B2
(45) Date of Patent: Nov. 18, 2025

(54) RESILIENTLY FLEXIBLE COMPOSITE ARTICLES WITH OVERMOLDED RIGID PORTIONS

(71) Applicant: Avient Corporation, Avon Lake, OH (US)

(72) Inventors: Brian Everett, Chesterfield, MO (US); Doug Hammond, Downey, CA (US); Rob Loveland, Delta, CO (US)

(73) Assignee: Avient Corporation, Avon Lake, OH (US)

( * ) Notice: Subject to any disclaimer, the term of this patent is extended or adjusted under 35 U.S.C. 154(b) by 407 days.

(21) Appl. No.: 17/421,969

(22) PCT Filed: Jan. 7, 2020

(86) PCT No.: PCT/US2020/012521
§ 371 (c)(1),
(2) Date: Jul. 9, 2021

(87) PCT Pub. No.: WO2020/146336
PCT Pub. Date: Jul. 16, 2020

(65) Prior Publication Data
US 2022/0120326 A1  Apr. 21, 2022

Related U.S. Application Data

(60) Provisional application No. 62/790,974, filed on Jan. 10, 2019.

(51) Int. Cl.
*F16F 1/368* (2006.01)
*B29C 70/16* (2006.01)
(Continued)

(52) U.S. Cl.
CPC ............ *F16F 1/3686* (2013.01); *B29C 70/16* (2013.01); *B29C 70/747* (2013.01); *B32B 3/16* (2013.01);
(Continued)

(58) Field of Classification Search
CPC ..... F16F 1/3686; F16F 2226/04; B29C 70/16; B29C 70/747; B29C 70/74; B32B 3/16;
(Continued)

(56) References Cited

U.S. PATENT DOCUMENTS

| 4,894,108 A | 1/1990 | Richard et al. |
| 5,463,794 A | 11/1995 | Erland |

(Continued)

FOREIGN PATENT DOCUMENTS

| CN | 204547648 U | 8/2015 |
| DE | 102006041654 A1 | 3/2008 |

(Continued)

OTHER PUBLICATIONS

European Patent Office: Application No. 20738249.0, Extended European Search Report dated Dec. 9, 2022, 9 pages.

(Continued)

*Primary Examiner* — Brian Handville
(74) *Attorney, Agent, or Firm* — Michael J. Sambrook; Emily E. Vlasek; David V. Monateri

(57) ABSTRACT

Resiliently flexible articles include a resiliently flexible element, a first rigid element, and a second rigid element. The resiliently flexible element is formed of a fiber reinforced polymeric composite. The first rigid element is formed of a first thermoplastic composition and at least a portion of the first rigid element is bonded, such as by an overmolding process, onto a first portion of the resiliently flexible element. Similarly, the second rigid element is formed of a second thermoplastic composition and at least a (Continued)

portion of the second rigid element is bonded, such as by an overmolding process, onto a second portion of the resiliently flexible element. The resiliently flexible articles can be useful as springs, limbs, living hinges, and the like.

18 Claims, 3 Drawing Sheets

(51) Int. Cl.
*B29C 70/74* (2006.01)
*B32B 3/16* (2006.01)
*B32B 27/38* (2006.01)
*C08J 5/04* (2006.01)
*C08K 7/06* (2006.01)
*C08K 7/14* (2006.01)
*B29K 101/12* (2006.01)

(52) U.S. Cl.
CPC ............... *B32B 27/38* (2013.01); *C08J 5/042* (2013.01); *C08J 5/043* (2013.01); *C08J 5/046* (2013.01); *C08K 7/06* (2013.01); *C08K 7/14* (2013.01); *B29K 2101/12* (2013.01); *B32B 2250/24* (2013.01); *B32B 2262/101* (2013.01); *F16F 2226/04* (2013.01)

(58) Field of Classification Search
CPC ................ B32B 27/38; B32B 2250/24; B32B 2262/101; C08J 5/042; C08J 5/043; C08J 5/046; C08J 5/04; C08K 7/06; C08K 7/14; C08K 7/02; B29K 2101/12
See application file for complete search history.

(56) References Cited

U.S. PATENT DOCUMENTS

| | | | |
|---|---|---|---|
| 7,582,345 B2 | 9/2009 | Priegelmeir et al. | |
| 9,038,241 B2 | 5/2015 | Masini | |
| 2009/0256296 A1* | 10/2009 | Aulich | F16F 1/368 267/148 |
| 2010/0233424 A1* | 9/2010 | Dan-Jumbo | B32B 27/38 428/113 |
| 2012/0108130 A1 | 5/2012 | Yuan et al. | |
| 2015/0343875 A1* | 12/2015 | Spiegel | F16F 1/368 280/5.515 |
| 2016/0122487 A1* | 5/2016 | Percec | C08L 77/02 442/179 |
| 2016/0297270 A1* | 10/2016 | Soles | B60G 11/10 |
| 2017/0341479 A1* | 11/2017 | Preijert | F16F 1/185 |

FOREIGN PATENT DOCUMENTS

| | | |
|---|---|---|
| EP | 0215365 B1 | 1/1990 |
| EP | 0332074 B1 | 8/1991 |
| JP | 58-94648 A | 6/1983 |
| JP | 6-307474 A | 11/1994 |
| WO | 2016025799 A1 | 2/2016 |

OTHER PUBLICATIONS

Daniel Flagg, Injection Overmolding of Continuous Fiber Thermoplastic Composites, CAMX Expo, Oct. 2018.

* cited by examiner

RESILIENTLY FLEXIBLE COMPOSITE ARTICLES WITH OVERMOLDED RIGID PORTIONS

CLAIM OF PRIORITY

This application claims the benefit of U.S. Provisional Patent Application Ser. No. 62/790,974 and filed on Jan. 10, 2019, which is hereby incorporated by reference in its entirety.

FIELD OF THE INVENTION

This invention relates to fiber reinforced polymeric composite articles, and more particularly to resiliently flexible fiber reinforced polymeric composite articles with rigid thermoplastics overmolded onto portions thereof.

BACKGROUND OF THE INVENTION

Demand exists for resiliently flexible articles such as springs in many applications within a variety of markets.

Fiber reinforced polymeric composite materials are among those materials which can be used to make springs and other resiliently flexible articles. Notwithstanding the many advantages of fiber reinforced composite materials relative to more traditional materials such as metals, conventional fiber reinforced composite springs still have shortcomings.

For example, when conventional fiber reinforced composite springs are used as components of industrial equipment such as vibratory conveyor systems, it can be necessary or desirable for separate washers, gaskets, or other reinforcing and/or sealing parts to be used at the points of contact or connection between the conventional fiber reinforced composite springs, the other components or equipment of the vibratory conveyor systems, and the bolts, screws, clamps, or other fastening means used to fasten the conventional fiber reinforced composite springs to the other components or equipment. Such a reinforcing and/or sealing part can be provided as a separate part at the time of assembly of the conventional fiber reinforced composite spring with the other components or equipment. However, doing so can be very inefficient. Such a reinforcing and/or sealing part also can be provided as a separate part and then affixed to the conventional fiber reinforced composite spring as part of a secondary process that occurs after manufacture of the conventional fiber reinforced composite spring and prior to assembly with the other components or equipment. But, such a secondary process can be labor intensive, slow, and otherwise still relatively inefficient.

SUMMARY OF THE INVENTION

Consequently, a need exists for resiliently flexible fiber reinforced polymeric composite articles such as springs which overcome the shortcomings of conventional fiber reinforced composite springs and provide advantages not heretofore achieved.

The aforementioned needs are met by one or more aspects of the disclosed invention.

Some aspects of the invention are directed to resiliently flexible articles including a resiliently flexible element, a first rigid element, and a second rigid element. The resiliently flexible element is formed of a fiber reinforced polymeric composite. The first rigid element is formed of a first thermoplastic composition and at least a portion of the first rigid element is bonded, such as by an overmolding process, onto a first portion of the resiliently flexible element. Similarly, the second rigid element is formed of a second thermoplastic composition and at least a portion of the second rigid element is bonded, such as by an overmolding process, onto a second portion of the resiliently flexible element.

Advantageously, the rigid elements can provide integrated reinforcement and/or sealing for the points of contact or connection for fastening the resiliently flexible article to separate components or equipment by bolts, screws, clamps, or other fastening means. Additionally, the rigid elements can stabilize those portions of the resiliently flexible article which are not intended to flex, bend, or otherwise deform under intended usage conditions, while allowing flexing, bending, or other deformation in those other portions of the resiliently flexible article which are intended to flex, bend, or otherwise deform under intended usage conditions.

Features of the invention will become apparent with reference to the following embodiments. There exist various refinements of the features noted in relation to the above-mentioned aspects of the disclosed invention. Additional features may also be incorporated in the above-mentioned aspects of the disclosed invention. These refinements and additional features may exist individually or in any combination. For instance, various features discussed below in relation to any of the described aspects of the invention may be incorporated into any of the described aspects of the invention alone or in any combination.

EMBODIMENTS OF THE INVENTION

Figure 1:
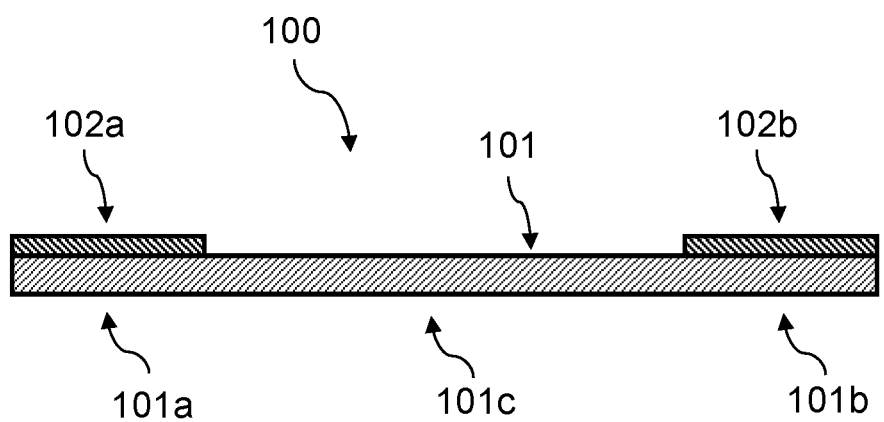
FIG. 1 is a side view of a resiliently flexible article according to a first exemplary embodiment of the disclosed invention.

Various embodiments of the invention are directed to resiliently flexible articles. Required and optional features of these and other embodiments of the invention are described.

As used herein, the term "aspect ratio" means, with respect to a fiber, a ratio of the length of the fiber to the outer diameter of the fiber.

As used herein, the term "bonded" means, with respect to a rigid element and the resiliently flexible element, that the rigid element is affixed to the resiliently flexible element without adhesive by chemical bonding and/or mechanical interlocking bonding, which can be achieved, for example, by an overmolding process.

As used herein, the term "continuous fiber" means a fiber having a length that is at least substantially equal to and continuous along at least one dimension of an article or part formed of a fiber reinforced polymeric composite including the fiber. It is understood that "continuous fiber" does not literally mean a fiber of infinite length. Generally, a continuous fiber has an aspect ratio that is relatively high, for example, greater than 500, or greater than 800, or greater than 1000.

As used herein, the term "continuous fiber reinforced polymeric composite" means a fiber reinforced polymeric composite including at least one continuous fiber. In some embodiments, the continuous fiber reinforced polymeric composite includes a plurality of continuous fibers in which, in some embodiments, the continuous fibers are unidirectionally oriented (i.e., aligned in a common direction) relative to each other. Continuous fiber reinforced polymeric composites can be made using a pultrusion process, which involves pulling continuous tows of the fiber through a resin melt, cooling to provide sheets, tapes, and other shapes, and subsequently cutting at a defined length.

As used herein, the term "formed of" means, with respect to an article or part and a material, that the article or part is fabricated, molded, shaped, or otherwise made from the material. The term "formed of" means the article or part can comprise, consist essentially of, or consist of, the material.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, the term "resiliently flexible" means, with respect to an article or part, that the article or part is capable of regaining its original shape or position after numerous repeated deformations under a force, such as at least one of compression, tension, torsion, bending, or shear, without substantially degrading the initial spring constant of the article or part.

As used herein, the term "rigid" means, with respect to a part or material from which the part is formed, that the part or material has a modulus of elasticity (either in flexure or tension) greater than 700 MPa (about 100 kpsi) at 23° C. and 50% relative humidity when tested in accordance with ASTM D747, D790, D638, or D882.

Resiliently Flexible Composite Articles

Some aspects of the invention are directed to resiliently flexible articles including a resiliently flexible element, a first rigid element, and a second rigid element.

According to the invention, the resiliently flexible element is formed of a fiber reinforced polymeric composite; the first rigid element is formed of a first thermoplastic composition and at least a portion of the first rigid element is bonded, such as by an overmolding process, onto a first portion of the resiliently flexible element; and the second rigid element is formed of a second thermoplastic composition and at least a portion of the second rigid element is bonded, such as by an overmolding process, onto a second portion of the resiliently flexible element.

Advantageously, the rigid elements can provide integrated reinforcement and/or sealing for the points of contact or connection for fastening the resiliently flexible article to separate components or equipment by bolts, screws, clamps, or other fastening means. Therefore, it is possible to eliminate a need for separate or secondary washers, gaskets, or other reinforcing and/or sealing parts at the points of connection.

Additionally, the rigid elements can stabilize those portions of the resiliently flexible article which are not intended to flex, bend, or otherwise deform under intended usage conditions, while allowing flexing, bending, or other deformation in those other portions of the resiliently flexible article which are intended to flex, bend, or otherwise deform under intended usage conditions. As such, the rigid elements can serve to control or direct the intended flexing, bending, or other deformation in the resiliently flexible article.

In some embodiments, the resiliently flexible article is capable of resiliently flexing at one or more portions other than the first portion or the second portion of the resiliently flexible element.

In some embodiments, the resiliently flexible article is capable of resiliently flexing at intended usage conditions under at least one of compression, tension, torsion, bending, and shear.

Resiliently Flexible Element

According to the invention, the resiliently flexible element is formed of a fiber reinforced polymeric composite.

In some embodiments, the fiber reinforced polymeric composite includes a plurality of continuous fibers disposed in a polymeric matrix. That is, in some embodiments, the fiber reinforced polymeric composite is a continuous fiber reinforced polymeric composite.

Continuous fiber reinforced polymeric composites are described in available references, for example, F. C. Campbell, Structural Composite Materials (ASM International 2010), and P. K. Mallick, *Fiber-Reinforced Composites: Materials, Manufacturing, and Design* (3d ed., CRC Press 2007), each of which is hereby incorporated by reference in its entirety.

Generally, in the continuous fiber reinforced polymeric composite, the orientation of the fiber can be unidirectional (i.e., one direction), bidirectional (i.e., two directions), or multidirectional (i.e., more than two directions).

In some embodiments, the plurality of continuous fibers includes continuous fibers. Suitable continuous fibers can be selected from among conventional and commercially available continuous fibers without undue experimentation by those of ordinary skill in the art. Non-limiting examples include aramid fibers, carbon fibers, glass fibers, polyamide fibers, polyester fibers, combinations thereof, and the like. For example, in certain embodiments, glass fibers are utilized.

In some embodiments, the polymeric matrix includes a thermosetting polymeric resin. Suitable thermosetting resins can be selected from among conventional and commercially available thermosetting resins without undue experimentation by those of ordinary skill in the art. Non-limiting examples include epoxies, phenolics, polyesters, polyurethanes, vinyl esters, and the like. For example, in certain embodiments, epoxies are utilized.

In some embodiments, the polymeric matrix includes a thermoplastic polymeric resin. Suitable thermoplastic resins can be selected from among conventional and commercially available thermoplastic resins without undue experimentation by those of ordinary skill in the art. Non-limiting examples include polyesters such as polybutylene terephthalate (PBT) and polyethylene terephthalate (PET), polyolefins such as polypropylene, polyamides, polyurethanes, and other thermoplastic resins as selected without undue experimentation by those of ordinary skill in the art.

In some embodiments, the polymeric matrix further includes one or more additives. Suitable additives can be selected from among conventional or commercially available plastics additives without undue experimentation by those of ordinary skill in the art. Suitable additives are described in available references, for example, E. W. Flick, "Plastics Additives Database," *Plastics Design Library* (Elsevier 2004). Additives can be used in any amount that is sufficient to obtain a desired processing or performance property for the polymeric matrix. The amount should not be wasteful of the additive nor detrimental to the processing or performance of the polymeric matrix and/or the fiber reinforced polymeric composite.

Generally, a continuous manufacturing process such as pultrusion can be used to make the continuous fiber reinforced polymeric composite. Suitable continuous manufacturing processes such as pultrusion processes are described in available references, for example, Suresh G. Advani and Kuang-Ting Hsiao (editors), *Manufacturing Techniques for Polymer Matrix Composites (PMCs)* (Woodhead Publishing 2012), Guneri Akovali (editor), *Handbook of Composite Fabrication* (Rapra Technology 2001), Raymond W. Meyer, *Handbook of Pultrusion Technology* (Chapman and Hall 1985), S. T. Peters (editor), *Handbook of Composites*, 2nd edition (Springer Science+Business Media 1998), and Trevor F. Starr (editor), *Pultrusion for Engineers* (CRC Press 2000), each of which is hereby incorporated by reference in its entirety.

In some embodiments, the fiber reinforced polymeric composite includes a first layer including a first plurality of unidirectionally oriented continuous fibers disposed in a first polymeric matrix. In other embodiments, the fiber reinforced polymeric composite further includes a second layer including a second plurality of unidirectionally oriented continuous fibers disposed in a second polymeric matrix.

In some embodiments, the first layer has a first orientation defined by a first direction of the first plurality of unidirectionally oriented continuous fibers, wherein the second layer has a second orientation defined by a second direction of the second plurality of unidirectionally oriented continuous fibers, and wherein the first orientation is 0° and the second orientation is any degree from 45° to 90° or from −45° to −90° relative to the first orientation.

In some embodiments, the fiber reinforced polymeric composite further includes one or more additional layers each including a plurality of unidirectionally oriented continuous fibers disposed in a polymeric matrix, and wherein each one or more additional layers has an orientation defined by a direction of the plurality of unidirectionally oriented continuous fibers, and wherein the orientation is any degree from 0° to 90° or 0° to −90° relative to the first orientation.

In each of the first, second, and one or more additional layers, the fibers and the polymeric matrix can be as described herein above. Further, in each of the first, second, and one or more additional layers, the fibers and the polymeric matrix can be the same as or different from the fibers and the polymeric matrix in each other layer.

Non-limiting examples of commercially available continuous fiber reinforced polymeric composites suitable for use in forming the resiliently flexible element of the disclosed invention include those available from PolyOne Corporation through its Advanced Composites business including but not limited to thermoset composite materials under the GORDON COMPOSITES brand and thermoplastic composite materials under the POLYSTRAND brand.

Rigid Elements

According to the invention, each rigid element is formed of a thermoplastic composition and at least a portion of the rigid element is bonded, such as by an overmolding process, onto a corresponding portion of the resiliently flexible element at a bond interface which is free of adhesive.

For example, in some embodiments, a first rigid element is formed of a first thermoplastic composition and at least a portion of the first rigid element is bonded, for example by an overmolding process, onto a first portion of the resiliently flexible element at a first bond interface which is free of adhesive, and a second rigid element formed of a second thermoplastic composition and at least a portion of the second rigid element is bonded, for example by an overmolding process, onto a second portion of the resiliently flexible element at a second bond interface which is free of adhesive.

Generally, each thermoplastic composition includes a thermoplastic resin and optionally one or more additives.

Suitable thermoplastic resins can be selected from among conventional and commercially available thermoplastic resins to be compatible for purposes of overmolding onto the resiliently flexible element without undue experimentation by those of ordinary skill in the art. Non-limiting examples include polyamides, polyesters such as polybutylene terephthalate (PBT) and polyethylene terephthalate (PET), polyolefins such as polyethylene and polypropylene, polyurethanes, polycarbonates (PC), acrylonitrile butadiene styrene (ABS), polycarbonate/acrylonitrile butadiene styrene (PC/ABS), styrene-acrylonitrile (SAN), and the like.

Suitable additives can be selected from among conventional or commercially available plastics additives without undue experimentation by those of ordinary skill in the art. Suitable additives are described in available references, for example, E. W. Flick, "Plastics Additives Database," *Plastics Design Library* (Elsevier 2004). Additives can be used in any amount that is sufficient to obtain a desired processing or performance property for the polymeric matrix. The amount should not be wasteful of the additive nor detrimental to the processing or performance of the thermoplastic composition and/or the rigid element. Non-limiting examples of optional additives include adhesion promoters; anti-fogging agents; antioxidants; anti-static agents; biocides (antibacterials, fungicides, and mildewcides); colorants including pigments and dyes; coupling agents; dispersants; fillers and extenders; flame retardants and smoke suppressants; hardness adjusters; impact modifiers; initiators; lubricants; micas; mold release agents; oils and plasticizers; processing aids; reinforcing agents such as fibers; secondary polymers; silanes, titanates and zirconates; slip and anti-blocking agents; stabilizers; stearates; ultraviolet light absorbers; viscosity regulators; and waxes.

In some embodiments, each rigid element is bonded onto or otherwise affixed to the resiliently flexible element without adhesive by chemical bonding achieved by an overmolding process.

In some embodiments, each rigid element is bonded onto or otherwise affixed to the resiliently flexible element without adhesive by mechanical interfacing bonding achieved by an overmolding process.

In some embodiments, each rigid element has a thickness and the thickness of each of rigid element is greater than the thickness of the flexible element. For example, in some embodiments, each of the first rigid element, the second rigid element, and the flexible element has a thickness, and the thickness of each of the first rigid element and the second rigid element is greater than the thickness of the flexible element.

In some embodiments, each rigid element has a thickness and the thickness of each of rigid element is less than the thickness of the flexible element. For example, in some embodiments, each of the first rigid element, the second rigid element, and the flexible element has a thickness, and wherein the thickness of each of the first rigid element and the second rigid element is less than the thickness of the flexible element.

EXEMPLARY EMBODIMENTS

Figure 2:
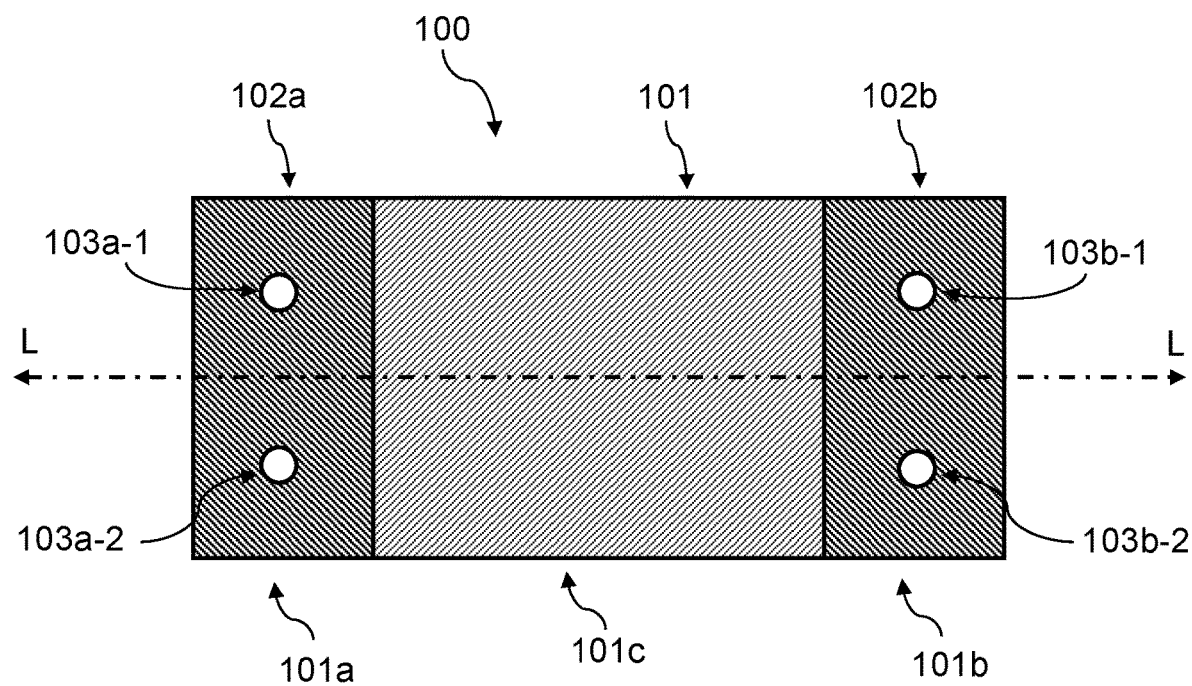
FIG. 2 is a top view of the resiliently flexible article according to the first exemplary embodiment of the disclosed invention.

With reference to FIGS. 1-2, a first exemplary embodiment of a resiliently flexible article 100 according to the disclosed invention is described.

The resiliently flexible article 100 includes a resiliently flexible element 101, a first rigid element 102a, and a second rigid element 102b, as depicted in FIGS. 1-2.

As depicted in FIGS. 1-2, the resiliently flexible element 101 is a substantially planar elongated body having a proximate portion 101a, a distal portion 101b, and an intermediate portion 101c between the proximate portion 101a and the distal portion 101b. The first rigid element 102a is bonded, such as by an overmolding process, onto the proximate portion 101a and the second rigid element is bonded, such as by an overmolding process, onto the distal portion 101b.

As depicted in FIG. 2, the substantially planar elongated body of the resiliently flexible element 101 has a longitudinal axis L, and each of the proximate portion 101a, the distal portion 101b, and the intermediate portion 101c has a dimension along the longitudinal axis L. Additionally, as depicted in FIG. 2, the dimension of the intermediate portion 101c along the longitudinal axis L is longer than the dimension of each of the proximate portion 101a and the distal portion 101b along the longitudinal axis L. Indeed, as depicted in FIG. 2, the dimension of the intermediate portion 101c along the longitudinal axis L is at least twice as long as the dimension of each of the proximate portion 101a and the distal portion 101b along the longitudinal axis L.

As depicted in FIGS. 1-2, each of the first rigid element 102a, the second rigid element 102b, the proximate portion 101a, and the distal portion 101b has an outer edge, and the outer edge of the first rigid element 102a is substantially flush with the outer edge of the proximate portion 101a, and the outer edge of the second rigid portion 102b is substantially flush with the outer edge of the distal portion 101b.

Additionally, as depicted in FIG. 2, at least one of the first rigid element 102a includes at least one aperture 103a-1, 103a-2 and the second rigid element 102b includes at least one aperture 103b-1, 103b-2. Each aperture 103a-1, 103a-2 and 103b-1, 103b-2 is through at least a thickness of the rigid element, and, optionally, a thickness of the resiliently flexible element.

Figure 3:
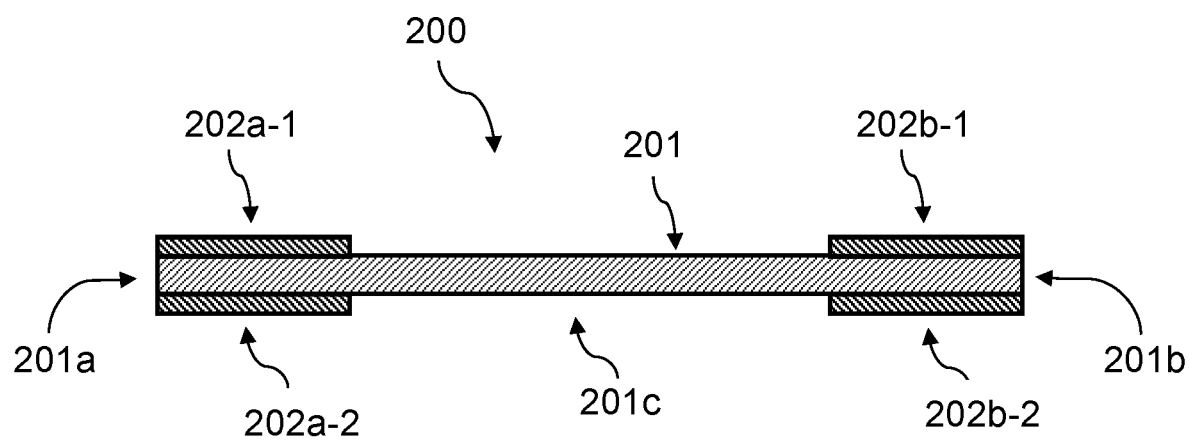
FIG. 3 is a side view of a resiliently flexible article according to a second exemplary embodiment of the disclosed invention.

With reference to FIG. 3, a second exemplary embodiment of a resiliently flexible article 200 according to the disclosed invention is described.

As depicted in FIG. 3, the resiliently flexible article 200 includes a resiliently flexible element 201, a first rigid element 202a-1, a second rigid element 202b-1, a third rigid element, 202a-2, and a fourth rigid element 202b-2.

As depicted in FIG. 3, the resiliently flexible element 201 is a substantially planar elongated body having a proximate portion 201a, a distal portion 201b, and an intermediate portion 201c between the proximate portion 201a and the distal portion 201b. The first rigid element 202a-1 is bonded onto a first portion of the proximate portion 201a, the second rigid element 202b-1 is bonded onto a first portion of the distal portion 201b, the third rigid element 202a-2 is bonded onto a first portion of the proximate portion 201a, and the fourth rigid element 202b-2 is bonded onto a second portion of the distal portion 201b.

Usefulness of the Invention

Resiliently flexible articles according to the disclosed invention can be useful in many applications in a variety of markets.

Beneficial properties include relatively low weight, exceptional strength, deep deflection capability, and high fatigue and stress resistance with capability of withstanding millions or even billions of cycles with no fatigue failure.

Non-limiting examples of possible applications include springs for industrial vibratory conveyor systems; springs for furniture such as adjustable seating; bows, limbs, and other components for archery equipment and other outdoor or sporting equipment; prosthetic limbs and other medical devices; and living hinges for doors, windows, hatches, and other openings/closures in trucking, trailers, rail, automotive, marine, building, construction, storage, appliances, and the like.

Without undue experimentation, those having ordinary skill in the art can utilize the written description to make and use aspects of the invention.

All documents cited in the Embodiments of the Invention are incorporated herein by reference in their entirety unless otherwise specified. The citation of any document is not to be construed as an admission that it is prior art with respect to the invention.

While particular embodiments of the invention have been illustrated and described, it would be obvious to those skilled in the art that various other changes and modifications can be made without departing from the spirit and scope of the invention. The appended claims are intended to cover all such changes and modifications that are within the scope of the invention.

What is claimed is:

1. A resiliently flexible article comprising:
    a resiliently flexible element formed of a fiber reinforced polymer composite comprising a plurality of continuous fibers disposed in a polymeric matrix;
    a first rigid element formed of a first thermoplastic composition, wherein at least a portion of the first rigid element is bonded onto a first portion of the resiliently flexible element at a first bond interface, and the first bond interface is free of adhesive, and the first rigid element has a modulus of elasticity greater than 700 MPa at 23° C. and 50% relative humidity; and
    a second rigid element formed of a second thermoplastic composition, wherein at least a portion of the second rigid element is bonded onto a second portion of the resiliently flexible element at a second bond interface, and the second bond interface is free of adhesive, and the second rigid element has a modulus of elasticity greater than 700 MPa at 23° C. and 50% relative humidity;
    wherein each of the first rigid element and the second rigid element is chemically bonded onto the resiliently flexible element by an overmolding process, and
    each of the first rigid element, the second rigid element, the proximate portion, and the distal portion has an outer edge, wherein the outer edge of the first rigid element is substantially flush with the outer edge of the proximate portion, and wherein the outer edge of the second rigid portion is substantially flush with the outer edge of the distal portion.

2. The article of claim 1, wherein the resiliently flexible element is a substantially planar elongated body having a proximate portion, a distal portion, and an intermediate portion between the proximate portion and the distal portion, and wherein the first rigid element is bonded onto the proximate portion and the second rigid element is bonded onto the distal portion.

3. The article of claim 2, wherein the substantially planar elongated body has a longitudinal axis, wherein each of the proximate portion, the distal portion, and the intermediate portion has a dimension along the longitudinal axis, and wherein the dimension of the intermediate portion along the longitudinal axis is longer than the dimension of each of the proximate portion and the distal portion along the longitudinal axis.

4. The article of claim 3, wherein the dimension of the intermediate portion along the longitudinal axis is at least twice as long as the dimension of each of the proximate portion and the distal portion along the longitudinal axis.

5. The article of claim 1, wherein the plurality of continuous fibers comprises continuous fibers selected from the group consisting of aramid fibers, carbon fibers, glass fibers, polyamide fibers, polyester fibers, and combinations thereof.

6. The article of claim 1, wherein the polymeric matrix comprises a thermosetting resin selected from the group consisting of epoxies, phenolics, polyesters, and vinyl esters.

7. The article of claim 6, wherein the continuous fibers are glass fibers and wherein the thermosetting resin is an epoxy.

8. The article of claim 1, wherein the polymeric matrix comprises a thermoplastic resin selected from the group consisting of polyamides, polyesters, and polyolefins.

9. The article of claim 8, wherein the thermoplastic resin is selected from the group consisting of polyethylene, polypropylene, and polyethylene terephthalate.

10. The article of claim 1, wherein the fiber reinforced polymer composite comprises a first layer comprising a first plurality of unidirectionally oriented continuous fibers disposed in a first polymeric matrix.

11. The article of claim 10, wherein the fiber reinforced polymer composite further comprises a second layer comprising a second plurality of unidirectionally oriented continuous fibers disposed in a second polymeric matrix.

12. The article of claim 11, wherein the first layer has a first orientation defined by a first direction of the first plurality of unidirectionally oriented continuous fibers, wherein the second layer has a second orientation defined by a second direction of the second plurality of unidirectionally oriented continuous fibers, and wherein the first orientation is 0° and the second orientation is any degree from 45° to 90° or from −45° to −90° relative to the first orientation.

13. The article of claim 12, wherein the fiber reinforced polymer composite further comprises one or more additional layers comprising a plurality of unidirectionally oriented continuous fibers disposed in a polymeric matrix, and wherein each one or more additional layers has an orientation defined by a direction of the plurality of unidirectionally oriented continuous fibers, and wherein the orientation is any degree from 0° to 90° or 0° to −90° relative to the first orientation.

14. The article of claim 1, wherein each of the first thermoplastic composition and the second thermoplastic composition comprises a thermoplastic resin independently selected from the group consisting of polyamides, polyesters, polyolefins, and combinations thereof.

15. The article of claim 14, wherein each of the first thermoplastic composition and the second thermoplastic composition further comprises one or more additives.

16. The article of claim 1, wherein each of the first rigid element, the second rigid element, and the flexible element has a thickness, and wherein the thickness of each of the first rigid element and the second rigid element is greater than the thickness of the flexible element.

17. The article of claim 1, wherein each of the first rigid element, the second rigid element, and the resiliently flexible element has a thickness, and wherein the thickness of each of the first rigid element and the second rigid element is less than the thickness of the resiliently flexible element.

18. The article of claim 1, wherein at least one of the first rigid element and the second rigid element comprises at least one aperture through at least a thickness of the rigid element, and, optionally, a thickness of the resiliently flexible element.

* * * * *